Figure 1:
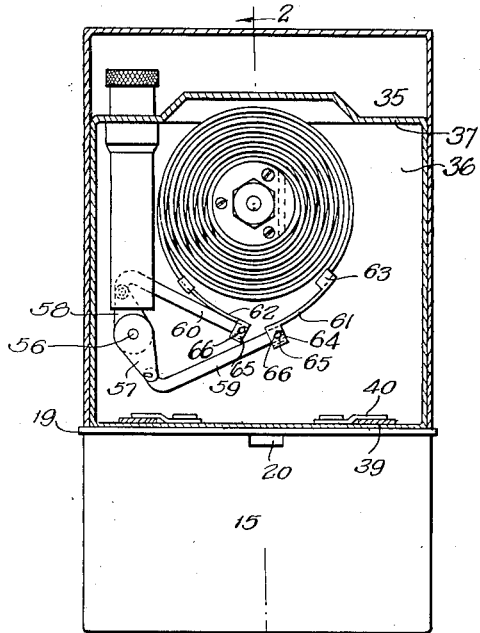

Feb. 5, 1935.  C. T. FRANTZ  1,989,856
RECORDING THERMOMETER
Original Filed March 16, 1925   2 Sheets-Sheet 1

Witness:
William P. Kilroy

Inventor:
Charles T. Frantz
By George S. Haight
Atty

Feb. 5, 1935.  C. T. FRANTZ  1,989,856
RECORDING THERMOMETER
Original Filed March 16, 1925   2 Sheets-Sheet 2
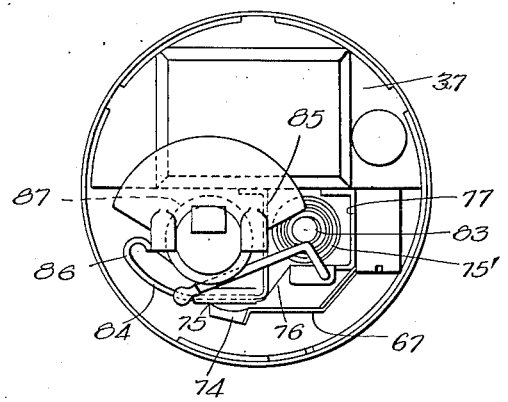
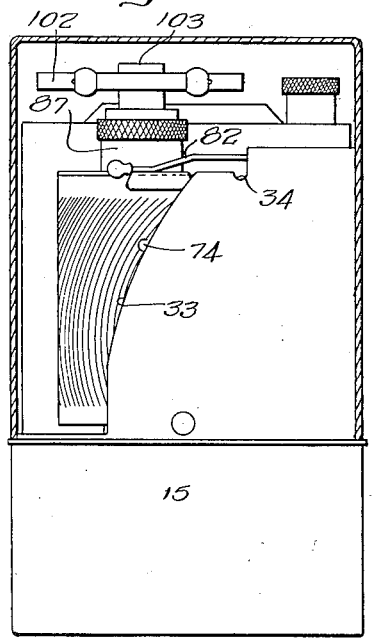
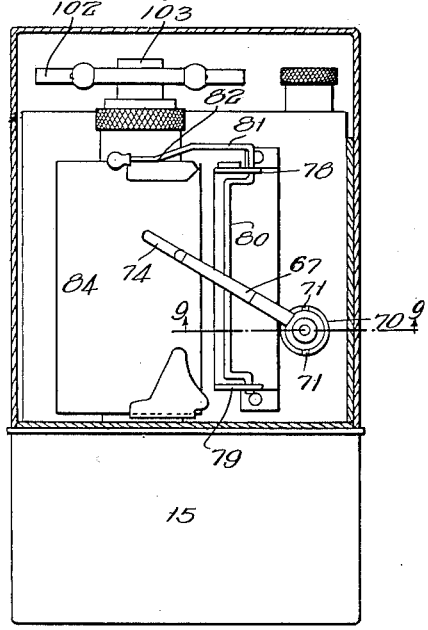
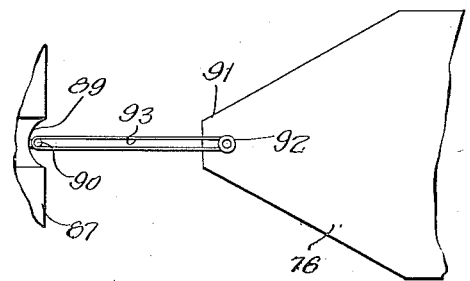
Witness:
William P. Kilroy
Inventor:
Charles T. Frantz
By George J. Haight
Atty.

Patented Feb. 5, 1935

1,989,856

UNITED STATES PATENT OFFICE 1,989,856

RECORDING THERMOMETER

Charles T. Frantz, Los Angeles, Calif., assignor, by mesne assignments, to Ryan Recording Thermometer Co., Los Angeles, Calif., a corporation of Delaware Original application March 16, 1925, Serial No. 15,745. Divided and this application October 7, 1929, Serial No. 398,022

6 Claims. (Cl. 73—118)

This invention relates to recording thermometers and is a division of my application, Serial No. 15,745, filed March 16, 1925, covering recording thermometers.

The general purpose of this invention is to provide a recording thermometer for use in connection with railway refrigerator cars in which fresh fruits and vegetables, and other perishable products, are transported from place to place, in order to obtain an accurate record of the temperature maintained in the car during the journey, such thermometer including thermostatic elements arranged in opposed relation so as to neutralize the vibrations imparted thereto during the travel of the car, in combination with a record sheet, and a stylus cooperating therewith, the movements of which are controlled by the thermostatic elements.

Another object of the invention is to provide improved means for adjusting the thermostatic elements relatively to each other and to the stylus, so as to insure the operation of the oppositely disposed thermostatic elements in unison, and to effect uniform transmission of the movements of said elements to the stylus, and to insure accurate cooperation of the stylus with the recording sheet upon which the variations in temperature are recorded.

Another object of the invention is to provide improved means for mounting and controlling the sheet upon which the variations in temperature are recorded, said means including a magazine, a platen over which the sheet travels, a spool upon which said sheet is wound, such spool being connected to clock mechanism by a clutch device; and improved means for connecting the sheet to the spool whereby the sheet is automatically centered upon the spool at all times.

Still another object of the invention is to provide a housing for the mechanism so arranged as to suspend the clockwork associated therewith to prevent injury thereto because of rough handling, and also arrange the casing in such manner that the recording tape or sheet is exposed to view to permit reading thereof, while portions of the casing are disposed in such a manner as to protect the stylus from injury.

Still another object of the invention is to provide an outer sealed container in which the thermometer may be placed, together with means for mounting such container in the car, and including means for preventing unauthorized opening of such container.

Other and further objects of the invention will more fully and clearly appear from the description and claims hereinafter following.

Figure 2:
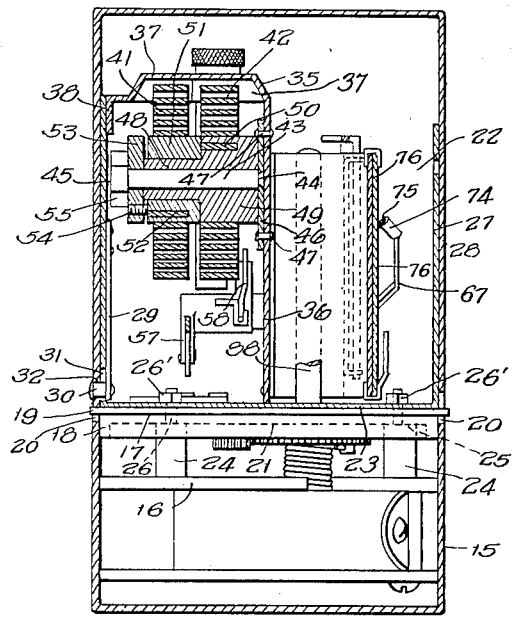
Figure 3:
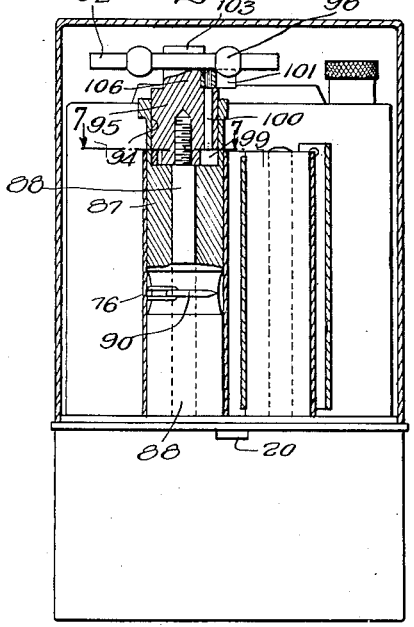
Figure 7:
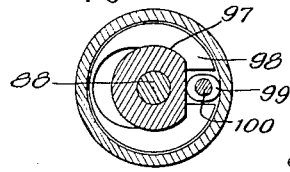
Figure 8:
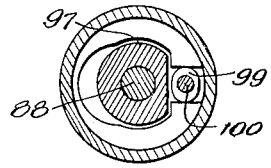
Figure 9:
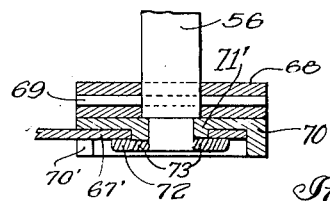

In the drawings Figure 1 is a partial central vertical sectional view of the device, showing portions of the operating mechanism in elevation. Figure 2 is a central vertical sectional view of the invention on the line 2—2 of Figure 1. Figure 3 is a view similar to Figure 1, showing the opposite side of the mechanism, a portion of the same being indicated in vertical section, and showing the clutch mechanism forming part of the invention. Figure 4 is a top plan view of the invention, the cover of the device being omitted to disclose the arrangement of the recording sheet and associated parts. Figure 5 is an elevational view similar to Figure 3, showing the arrangement of the casing, and of the recording sheet. Figure 6 is a view similar to Figure 5, a portion of the casing being omitted to clearly show the means for controlling the position of the stylus. Figure 7 is an enlarged sectional detailed view of the clutch mechanism forming part of the invention, such view being taken upon the line 7—7 of Figure 3, the clutch being shown in inoperative position. Figure 8 is a view similar to Figure 7, showing the clutch in operative position. Figure 9 is an enlarged detailed sectional view of the stylus adjusting means, said view being taken on the line 9—9 of Figure 6. And Figure 10 is an enlarged detailed view of the recording sheet, showing the manner of securing the same to the spool associated with the clockwork.

As shown in the drawings, 15 denotes an annular receptacle adapted to house clock mechanism indicated generally at 16, the clock mechanism per se being of standard construction and forming no part of the present invention. A cap 17 is provided for closing the receptacle 15, said cap having a vertical annular flange 18 having a driving fit with the interior walls of the receptacle 15, and being provided with a laterally disposed annular flange 19 adapted to rest upon the top edges of the receptacle 15, the edges of the receptacle 15 being provided with suitable notches 20 for the reception of a suitable tool to permit the cap to be withdrawn from the receptacle if necessary. Disposed above the top wall 21 of the cap 17 is a cup-shaped member 22, provided with a bottom 23 which rests upon the wall 21 as best shown in Figure 2. The clockwork 16 is provided with posts 24, having shoulders 25 which rest against the under surface of the wall 21 of the cap. Reduced portions 26 are formed on the posts, which reduced portions extend through the wall 21 of the cap and the bottom wall 23 of the cup member 22, nuts 26' being threaded upon said reduced portions for securing the same in position. By this arrangement the clockwork 16 is suspended from the top wall 21 of the cap and the bottom wall 23 of the cup-shaped member 22, thus preventing the bottom of the clock mechanism from striking the bottom of the receptacle 15, and minimizing the shocks to which the clock is subjected due to rough handling of the device. The cup-shaped member 22 is provided with an annular wall 27, formed integrally with the bottom 23 of the member, and the diameter of the member 22 is somewhat less than the flange 19 of the cap 17 to provide a support for the bottom edges of the cover 28. The wall 27 of the member 22 is provided with a spring 29 to which is connected a pin 30 extending through a slot 31 formed in the wall 27, the cover 28 being provided with an aperture 32 with which said pin is adapted to engage to hold the cover 28 in position upon the device. The wall 27 of the member 22 is cut out as indicated at 33, and notched at 34, to afford a clear view of the recording sheet, and to cooperate with the means controlling the stylus, as hereinafter more particularly described.

Mounted within the cup-shaped member 22 is a casing 35 comprising the flat vertical wall 36 and the top horizontal wall 37. The vertical wall 36 forms a diametrically disposed partition in said cup-shaped member 22. The vertical edges of said partition wall 36 rest against the inner surfaces of the annular wall 27. The top wall 37 of said casing 35 is semi-circular and at its curved edge has a downwardly turned flange 38 conforming to the curvature of and adapted to engage the interior surface of the wall 27. The wall 36 is provided on its lower edge with in-turned flanges 39, and such flanges are adapted to be engaged by means of latches 40 pivotally mounted on the bottom wall 23 of the cup-shaped member 22, so as to lock the casing 35 in position.

The thermostatic elements are in the form of oppositely disposed spiral coils 41 and 42, each of which is made up of bi-metallic material, one of which, preferably brass, has a high coefficient of expansion and the other of which, preferably an alloy of nickel and steel, has a coefficient of expansion which is practically negligible. The coils are supported generally by means of a post 43, the inner end of which is riveted in a base plate member 46 as shown at 44, the outer end of such post being threaded as indicated at 45. The base plate member 46 is secured to the partition wall 36 or casing 35 by means of securing elements 47. The coil 42 is mounted upon the sleeve 48 which is provided with an enlarged annular portion 49 provided with a slot 50 in which the inner end of the coil 42 is disposed, and securely fastened therein by means of solder. The inner end of the sleeve 48 rests against the base member 46, and the outer end of such sleeve provides a reduced portion upon which is mounted a ring 51, such ring being provided with a slot 52 for the reception of the inner end of the coil 41, such end being secured in the slot by solder. The ring 51 rests against the shoulder provided by the enlarged portion 49 of the sleeve 48, and the outer edge of such ring terminates short of the outer end of the sleeve. A washer 53 is rotatably mounted on the post 43, and bears against the outer end of the sleeve 48, such washer being provided with adjusting screws 54, adapted to engage the adjacent edge of the ring 51. A nut 55 is threaded on the portion 45 of the post and bears against the washer 53. By this arrangement it will be evident that by loosening the nut 55, the coils 41 and 42 may be rotated relatively to each other, and thereafter independently adjusted by operation of the nut 55 and the screws 54 associated with the washer 53.

Mounted at one side of the coils 41 and 42 is a rotatable shaft 56, such shaft being provided with inner and outer diametrically opposed cranks 57 and 58, the crank 57 being connected to the outer end of the coil 41, and the crank 58 connected to the outer end of the coil 42. Such connections include links 59 and 60, and extensions 61 and 62 provided upon the outer end of the coils. Each of the extensions 61 and 62 is formed of bendable material, the inner end of the same being provided with clips 63 which fit over the end of the coil, and the outer end of which is provided with ears 64 having an opening 65 therein, adapted for the reception of a pin 66 which extends through the end of the associated link connected to the crank. This feature of the invention is of considerable importance in obtaining the fine adjustment in a device of this character, it being noted that bending the portion 61 or 62 inwardly or outwardly relative to the axis of the coil, changes the radius of throw of the outer end of the coil. The shaft 56 extends outwardly through the partition 36 a suitable distance and to the outer end of the same is connected a stylus 67 by means of an adjustable connection. As best shown in Figure 9, said connection comprises a disc 68 fixed adjacent to the outer end of the shaft, and provided with an opening 69 in its edge. Rotatably mounted upon the shaft in position to bear against the upper surface of the disc 68 is a cup 70, having diametrically disposed notches 71 (Fig. 6) in its edges, these notches being provided for engagement by a small wrench for rotating the cup to adjust the pen. The rear end 67' of the pen 67 is annular in form and provided with an opening which fits over a centrally disposed boss 71' forming part of the member 70, the arm of the pen extending outwardly through another notch 70' (Fig. 9) in the edge of the cup 70. A washer 72 is placed upon the outer end of the shaft and bears upon the boss 71' and the portion 67' of the pen 67, so as to force the member 70 against the disc 68, the washer 72 being locked or fastened in position by burring over the edges of the end of the shaft as indicated at 73. By this arrangement a frictional connection between the disc 68 and member 70 is provided which affords means for arriving at an accurate adjustment of the parts which is necessary.

The pen proper is in the form of a small ink cylinder 74, secured to the arm 67, preferably integrally secured, the forward portion of the cylinder being open and split to provide the nibs 75. The rear wall of the cylinder is preferably perforated to facilitate placing the ink therein.

The pen proper is adapted for cooperation with the recording sheet 76, forming part of the recording mechanism. Such mechanism comprises a magazine 77 in the form of an angular plate, provided with out-turned flanges 78 and 79 on its top and bottom edges. Mounted in the flanges 78 and 79 formed on the magazine section 77 is a crank 80, which is disposed beneath the pen arm 67 and is actuated by the handle 81 to lift the pen out of operative position, the extremity of the handle being bent as indicated at 82 for engagement with the notch 34 in the adjacent portion of the casing to hold the pen in inoperative position. The magazine 77 is provided with a central pin 83 secured to the bottom of the cup member 22, upon which the rolled portion 75' of the recording sheet is placed. The outer end portion of the recording sheet is led over a platen 84, such platen comprising a member having an angular portion 85 secured to the partition 36, the platen having a curved portion 86 extending about a take-up means which is in the form of the spool 87, which is rotatably mounted upon the rotatable shaft 88 connected with the clock mechanism 16. The spool is provided with a groove 89 intermediate its ends, in which is mounted the hook 90, such hook being spaced intermediately between the bottom of the spool 87, and the upper edge of the platen 84. The recording sheet 76 has its outer end tapered to a central point, as indicated at 91, and secured to a central rivet or eye 92 in the end portion of the sheet is a flexible loop 93, preferably of silk thread, which loop is adapted to be attached to the hook 90 of the spool 87. By the use of this flexible connection the tape or sheet 76 is automatically centered with reference to the spool, and any tendency of such tape to travel laterally with respect to the spool, and so destroy the accuracy of the record, is obviated.

The top portion of the spool is provided with a recess 94, and disposed in such recess is the shank portion 95 of the key 96, the shank portion normally being spaced slightly from the inner walls of the recess to permit normally free rotation of the spool relatively to the key 96. The key 96 has threaded engagement with the upper end of the rotatable shaft 88, and is adapted to rotate such shaft to wind up the spring of the clock mechanism. The key 96 is provided with clutch means for securing the spool 87 thereto so that the same will rotate when the shaft 88 is rotated. Such mechanism comprises a reduced portion 97 on the lower end of the key, about which is disposed a split resilient ring 98, having its ends spaced apart for the accommodation of a cam 99, such cam being fixed to the rotatable shaft 100 mounted in the shank 95 of the key 96, the upper end of such shaft being provided with a lever 101 by which the shaft 100 may be rotated to operate the cam 99. The clutch mechanism is such that the spool may be engaged or disengaged with the clock mechanism at will. The key 96 is provided with a swingable finger-piece 102, and to prevent dropping of the finger-piece to such an extent that the same will interfere with the top portion 37 of the partition 36, I provide such finger-piece with a stop 103, which limits the downward movement of the same. The thermometer as above decribed is entirely enclosed except for apertures permitting circulation within the interior of the device.

In operation, assuming the recording sheet 76 to be in position upon the platen and having its end connected to the spool 87 by means of the loop 93, the spool is clutched to the rotatable element 88 associated with the clock mechanism, causing the sheet to feed out of the magazine. The variations in temperature are transmitted through the thermostatic elements to the pen 67, which marks the sheet in accordance with its position. When installing or removing a record sheet, the pen may be held in retracted position by operation of the handle 81 connected to the crank 80, such handle engaging the notch 34 in the cup-shaped member to hold the same in fixed position. Upon release of the crank member, the pen resumes its writing position by reason of the inherent resiliency of the pen arm 67. The spool 87 may be connected and disconnected from the rotatable shaft 88 by operation of the lever 101 connected to the shaft 102, which rotates the cam 99 so as to spread the ring 98 to a tight frictional engagement with the adjacent surfaces of the spool.

When it is desired to adjust the thermostatic elements to assure their uniform operation, the coil 42 is first tested, any adjustment necessary being accomplished by loosening the nut 55 and moving the coil the required distance, after which the nut 55 may be tightened so as to hold the coil 42 in adjusted position. It will be noted that the ring 51, when the screws 54 in the collar 53 are loosened, is free to rotate, whereby the coil may be moved the proper distance, after which the screws 54 may be tightened to hold the coil 41 in adjusted position. This means permits of an approximate adjustment only, and since the adjustments in a mechanism of this character must be absolutely accurate, the additional means in the form of the bendable elements 61 and 62 associated with the outer ends of the coils is provided for making fine adjustment. By bending these ends, the radial throw of the coils is varied until the throw of the coils is exactly the same, and this is conveniently determined by lining up the apertures in the ends of the links 59 and 60 until both of the pins fit the apertures provided therefor, the distance between the pivotal points of the links associated with the cranks 57 and 58 being exactly similar.

The pen also may be adjusted relative to the shaft without the necessity of adjusting the coil, since such pen is frequently accidentally moved out of alignment. This adjustment may be effected by holding the shaft 56 stationary by means of any suitable tool inserted within the opening 69 in the collar 68, and engaging the notches 71 in the cup 70 by means of a small wrench, the parts being normally held by friction against accidental rotation.

While I have herein shown and described what I now consider the preferred manner of carrying out my invention, the same is merely illustrative and I contemplate all changes and modifications that come within the scope of the claims appended hereto.

I claim:

1. In a thermometer mechanism of the character described, the combination of oppositely disposed thermostatic coils; and an indicating member connected with the outer ends of said coils; means for adjustably mounting the inner ends of said coils to effect adjustment of said indicating member, said means comprising: a stationary element; a sleeve rotatably mounted on said stationary element and connected to the inner end of one of said coils; a collar rotatably mounted on said sleeve, and connected to the other of said coils, the end of said sleeve projecting beyond said collar; means for adjustably holding said sleeve against rotation; and independent means for adjustably maintaining said collar against rotation.

2. A thermometer comprising oppositely wound thermostatic coils; indicating means adapted to be moved by said coils; means connecting said indicating means with said coils, said means including parts bendable to vary the path of travel of the actuating portions of said coils; means for adjustably mounting the inner ends of said coils, said means comprising a post having a sleeve rotatably mounted thereon, and having the inner end of one of said coils connected thereto; a member rotatably mounted on said sleeve and having the other of said coils connected thereto, said sleeve extending beyond said member; means for locking said sleeve against rotation; and independent means for locking said rotatable member against rotation.

3. A thermometer comprising oppositely wound thermostatic coils; of means for adjustably mounting the inner ends of said coils, said means comprising a member to which the inner end of one coil is connected, said member being provided with a sleeve portion, and a second member rotatably mounted on said sleeve portion and connected to the inner end of the other coil, whereby the inner ends of said coils are relatively adjustable; and means for clamping said members to maintain the inner ends of the coils in adjusted position.

4. A thermometer comprising oppositely wound thermostatic coils, having their free ends composed of bendable material by which said ends are adapted to be adjustably secured to mechanism actuated thereby; and adjusting means for the inner ends of said coils comprising relatively movable rotatable members to each of which the inner end of one coil is connected, and means for clamping said members in adjusted position.

5. In a thermometer mechanism, the combination of a casing, a movable indicator and thermostatic means for actuating said indicator, a scale for indicating the movement of said indicator, said indicator being mounted for movement into and out of indicating relation to said scale, a wall surrounding said scale and disposed over said indicator to protect the same, said wall having a cut-out portion for exposing the scale, and lever means for moving said indicator out of indicating relation to said scale, and means on said wall adapted to be engaged by said lever means to maintain the indicator in retracted position.

6. In a thermometer mechanism for refrigerator cars, including oppositely disposed thermostatic coils, a shaft, means connecting said coils and said shaft, an indicating member mounted on said shaft, and means providing for adjustment of said indicating member relatively to the shaft, said means comprising a collar fixed to said shaft, a cup-shaped member having diametrically disposed notches in its edges for engagement by a tool and a centrally disposed boss, said indicating member having an annular portion fitting over said boss, and a securing member mounted on said shaft and bearing against said annular portion of the indicating member and said boss of the cup-shaped member to provide friction between the cup-shaped member and said collar.

CHARLES T. FRANTZ.